US007254995B2

(12) United States Patent
Leska, Sr. et al.

(10) Patent No.: US 7,254,995 B2
(45) Date of Patent: Aug. 14, 2007

(54) CONTROL METHODOLOGY FOR A MULTI-AXIAL WHEEL FATIGUE SYSTEM

(75) Inventors: Paul J. Leska, Sr., Chanhassen, MN (US); Craig L. Campbell, Maple Grove, MN (US); Eric W. Young, Eden Prairie, MN (US); Bradley C. Achorn, Burbank, CA (US)

(73) Assignee: MTS Systems Corporation, Eden Prairie, MN (US)

( * ) Notice: Subject to any disclaimer, the term of this patent is extended or adjusted under 35 U.S.C. 154(b) by 7 days.

(21) Appl. No.: 11/155,900

(22) Filed: Jun. 17, 2005

(65) Prior Publication Data

US 2006/0243042 A1 Nov. 2, 2006

Related U.S. Application Data

(60) Provisional application No. 60/580,566, filed on Jun. 17, 2004.

(51) Int. Cl.
*G01M 17/013* (2006.01)
(52) U.S. Cl. .................................................... 73/146
(58) Field of Classification Search ................ 73/146, 73/146.2, 11.04, 11.07, 669, 670, 121, 123, 73/862.042, 862.043
See application file for complete search history.

(56) References Cited

U.S. PATENT DOCUMENTS

| 3,772,550 | A | 11/1973 | Anselmino | 188/181 |
|---|---|---|---|---|
| 3,944,864 | A | 3/1976 | Jovick | 188/181 |
| 3,977,243 | A | 8/1976 | Yamada et al. | |
| 4,047,338 | A * | 9/1977 | Gormish et al. | 451/1 |
| 4,160,378 | A | 7/1979 | Himmier | 73/146 |
| 4,475,383 | A | 10/1984 | Fischer et al. | 73/146 |
| 4,499,759 | A | 2/1985 | Hull et al. | 73/146 |
| 4,577,497 | A | 3/1986 | Ray et al. | 73/126 |

(Continued)

FOREIGN PATENT DOCUMENTS

DE 10013965 10/2001

(Continued)

OTHER PUBLICATIONS

"Biaxial Wheel/Hub Test Facility", Proceedings of 3rd International User Meeting, Sep. 11, 1997, pp. 1-65.

(Continued)

*Primary Examiner*—Eric S. McCall
(74) *Attorney, Agent, or Firm*—Steven M. Koehler; Westman, Champlin & Kelly, P.A.

(57) ABSTRACT

A testing system and a method for obtaining drive files for the testing system for wheel rim testing, includes providing a wheel assembly in contact with a drum surface, the wheel assembly being rotatable about an axis defining a lateral axis, and wherein a vertical axis extends through a drum surface in contact with a tire of the wheel assembly and is orthogonal to the lateral axis, and a longitudinal axis is defined orthogonal to both the lateral and vertical axes. A parameter is measured indicative of an overturning moment applied to the wheel rim about the longitudinal axis. A camber angle of the wheel rim relative to the drum surface is adjusted to obtain a desired overturning moment on the wheel rim about the longitudinal axis.

28 Claims, 7 Drawing Sheets

U.S. PATENT DOCUMENTS

| | | | |
|---|---|---|---|
| 4,679,327 A * | 7/1987 | Fouchey et al. | 33/203.13 |
| 4,856,199 A * | 8/1989 | Merrill et al. | 33/203.17 |
| 4,856,324 A | 8/1989 | Potts | 73/146 |
| 4,907,445 A | 3/1990 | Okumura | 73/118.1 |
| 4,939,435 A | 7/1990 | Takahashi et al. | 318/432 |
| 4,969,694 A | 11/1990 | Caron | 188/181 |
| 4,981,034 A | 1/1991 | Haeg | 73/118.1 |
| 5,018,597 A | 5/1991 | Wakabayashi et al. | 180/247 |
| 5,025,884 A | 6/1991 | Wakabayashi | 180/247 |
| 5,083,453 A | 1/1992 | Daley | 73/118.1 |
| 5,097,701 A | 3/1992 | Nantua et al. | 73/118.1 |
| 5,097,702 A | 3/1992 | Nantua et al. | 73/118.1 |
| 5,241,854 A | 9/1993 | Kaizu et al. | 73/117 |
| 5,241,856 A | 9/1993 | Petersen et al. | 73/118.1 |
| 5,259,246 A | 11/1993 | Stuyts | 73/669 |
| 5,263,366 A | 11/1993 | Sakamoto | 73/118.1 |
| 5,281,911 A | 1/1994 | Caron et al. | 188/181 |
| 5,291,130 A | 3/1994 | Kendzior | 188/181 |
| 5,452,605 A | 9/1995 | Wilson et al. | 73/117 |
| 5,477,943 A | 12/1995 | Enomoto | 188/1.11 |
| 5,496,102 A | 3/1996 | Dimatteo et al. | 303/162 |
| 5,513,438 A * | 5/1996 | Emmons | 33/203.12 |
| 5,540,099 A | 7/1996 | Harashima | 73/669 |
| 5,610,330 A | 3/1997 | Fricke et al. | 73/669 |
| 5,646,849 A | 7/1997 | Walenty et al. | 364/426 |
| 5,703,284 A | 12/1997 | Gerhards et al. | |
| 5,777,219 A | 7/1998 | Popio et al. | |
| 5,789,668 A | 8/1998 | Coe et al. | 73/146 |
| 5,886,350 A * | 3/1999 | Cook et al. | 250/225 |
| 5,900,542 A | 5/1999 | Fricke et al. | |
| 6,006,597 A | 12/1999 | Miyazaki | 73/118.1 |
| 6,032,520 A | 3/2000 | Miyazaki | 73/118.1 |
| 6,116,084 A | 9/2000 | Fischer et al. | 73/146 |
| 6,278,216 B1 | 8/2001 | Li | 310/254 |
| 6,382,020 B1 | 5/2002 | Fischer et al. | |
| 6,729,178 B2 | 5/2004 | Leska, Sr. et al. | 73/146 |
| 6,813,938 B2 | 11/2004 | Schwendemann | 73/146 |
| 2002/0011102 A1 | 1/2002 | Leska, Sr. et al. | |
| 2003/0209061 A1 * | 11/2003 | Schoeninger | 73/118.1 |

FOREIGN PATENT DOCUMENTS

| | | |
|---|---|---|
| EP | 0147595 | 7/1985 |
| EP | 0302488 | 2/1989 |
| EP | 0 406 537 A2 | 1/1991 |
| EP | 0507058 A2 | 2/1992 |
| EP | 0927879 A1 | 12/1998 |
| EP | 0928961 A2 | 1/1999 |
| EP | 0916935 | 5/1999 |
| EP | 1279943 | 1/2003 |
| GB | 762 805 A | 12/1956 |
| WO | WO 95 16903 A | 6/1995 |
| WO | WO 01/71307 A1 | 9/2001 |

OTHER PUBLICATIONS

Biaxial Hydropuls™ test rigs for automotive wheels and hubs, 2003.

SAE International Surface Vehicle Recommended Practice, Issued Aug. 2003, pp. 1-17.

PCT International Search Report for PCT/US2005/021833, filed Jun. 17, 2005.

MTS Model 855 Multiaxial Wheel Fatigue System For Testing the Durability of Pasenger Car and Light Truck Wheels, copyright 2003.

MTS Model 855 Biaxial Wheel Fatigue Test System, Quotation date May 17, 2004, pp. 1-14.

MTS Invention Disclosure, "Control Methodology for a Multi-Axial Wheel Fatigue System", pp. 1-4, Dec. 3, 2003.

* cited by examiner

CONTROL METHODOLOGY FOR A MULTI-AXIAL WHEEL FATIGUE SYSTEM

CROSS-REFERENCE TO RELATED APPLICATION

This application claims the benefit of U.S. Provisional Patent Application 60/580,566, filed Jun. 17, 2004, the content of which is hereby incorporated by reference in its entirety.

BACKGROUND OF THE INVENTION

The present invention relates to testing apparatuses used to test components of a motor vehicle. More particularly, the present invention relates to a testing apparatus used to test tire, wheel, spindle and/or braking components of a motor vehicle.

A rolling wheel testing apparatus using the inside of a rotating drum was developed by the Fraunhofer-Institut Fur Betriebsfestigkeit and has been shown to be an effective test technique. Generally, a tire and wheel are mounted to a drive motor and is disposed within a drum where the tire engages an inside circumferential surface. Improvements have been made on the original design to simulate loading when the tire and wheel rim are mounted to a motor vehicle as the motor vehicle travels down a road. The loading can include radial wheel loading to simulate the weight and dynamic loading of the vehicle and lateral loading where the load is applied along the axis of rotation of the tire and wheel rim. In yet further embodiments, applications of driving and braking torque have also been proposed in "Adapting the Biaxial Wheel Test System for Brake Components and Lug-Loosening", published in the Proceedings of the 3rd International User Meeting, Sept. 11, 1997, Darmstadt, Germany.

Although the original design has been found effective and improvements have been made to simulate road conditions, shortcomings are still present. For instance, the radial and axial forces acting on the vehicle wheels are not constant, but are dependent on a variety of factors. In order to duplicate forces acting on vehicle components, strain gauges are commonly provided on components of interest and the vehicle is driven under real world conditions and data is collected therefrom. Actuators are operated to apply loads to vehicle components in the laboratory having similar strain gauges to approximate the loads seen during real world conditions. However, a complicated setup procedure (i.e. mapping process) is required before testing can even begin. For instance, a test wheel rim or wheel rims incorporating strain gauges can be used in the laboratory for setup. Forces are then applied, and the strain gauge outputs are monitored to determine if the desired strain fields exist in the test wheel rim. The machine camber angle settings of the wheel assembly along with applied forces (load pair) are iteratively adjusted, until the strain field readings are satisfactory. This setup procedure complicates testing because it takes a considerable amount of time as well as causes wear upon the test specimen.

SUMMARY OF THE INVENTION

A testing system and a method for obtaining drive files for the testing system for wheel rim testing, includes providing a wheel assembly in contact with a drum surface, the wheel assembly being rotatable about an axis defining a lateral axis, and wherein a vertical axis extends through a drum surface in contact with a tire of the wheel assembly and is orthogonal to the lateral axis, and a longitudinal axis is defined orthogonal to both the lateral and vertical axes. A parameter is measured indicative of an overturning moment applied to the wheel rim about the longitudinal axis. A camber angle of the wheel rim relative to the drum surface is adjusted to obtain a desired overturning moment on the wheel rim about the longitudinal axis.

DETAILED DESCRIPTION OF THE ILLUSTRATIVE EMBODIMENTS

Figure 1:
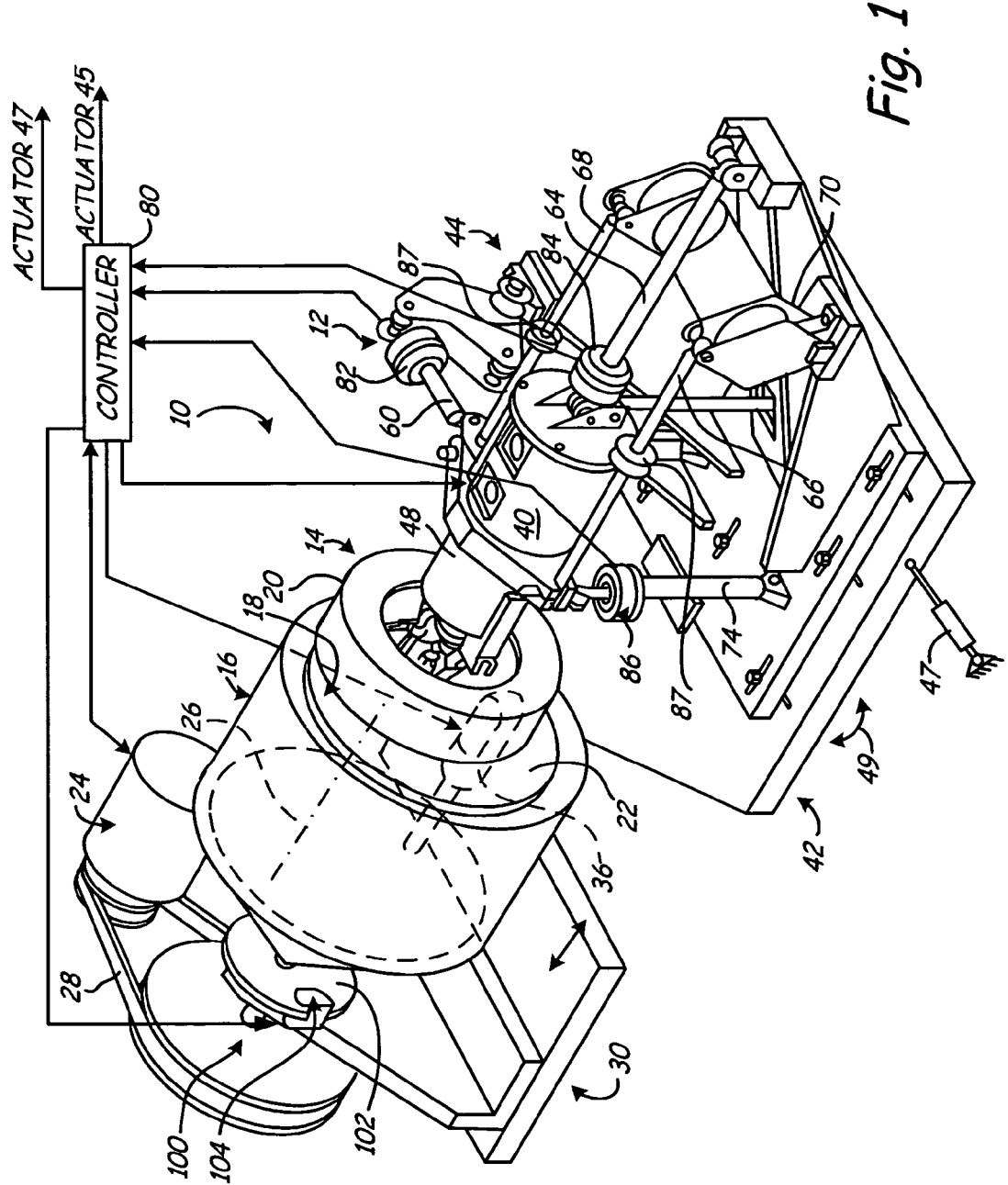
FIG. 1 is a somewhat schematic perspective view of a rolling wheel testing apparatus with portions removed for practicing aspects of the present invention.

An exemplary rolling wheel testing apparatus capable of practicing the present invention is illustrated in FIG. 1 at 10. It should be noted that apparatus 10 is but one testing apparatus where those skilled in the art can appreciate aspects of the present invention can be used on other testing apparatuses, and in particular, those testing apparatuses applying loads using actuators arranged differently.

Before describing the control methodology, the testing apparatus 10 will be described. Only a brief description will be provided herein. U.S. Pat. No. 6,729,178 provides a further description and is incorporated herein by reference in its entirety. It should also be understood that the apparatus 10 is a triaxial machine that incorporates brake/drive torque. The control methodology described below can also be used with a biaxial testing apparatus that does not have brake/drive torque load inputs.

Generally, the testing apparatus 10 includes a support structure 12 that supports a tire and wheel rim assembly 14 in engagement with a rotating drum 16 In the embodiment illustrated, the rotating drum 16 includes a large inner cavity 18 into which the tire and wheel rim assembly 14 is disposed so that a tire 20 engages an inner circumferential surface 22. In one mode of operation, a suitable hydraulic or electric motor 24 drives the drum 16 to rotate about an axis 26. In the embodiment illustrated, an endless member 28, such as a belt or chain, is provided for speed reduction and amplification of drum torque, although direct coupling of the motor 24 to the drum 16 can be used, if desired. A brake assembly for the drum 16 comprising brake disc 102 and brake 104 is also illustrated.

At this point it should be noted as used herein, forces applied to wheel rim of the wheel assembly 14 include Fx, which is a longitudinal or braking/driving force seen by the wheel along a longitudinal axis, Fy, which is a lateral force along a lateral axis, which is normal to the longitudinal force Fx and parallel to the axis of rotation of the wheel, and Fz, which is a vertical force along a vertical axis, which is normal to both the longitudinal force Fx and lateral force Fy. In addition, the combination of forces produce moments Mx (camber or overturning moment about Fx), My (braking moment about Fy), and Mz (steer moment about Fz) in the wheel rim of the wheel assembly 14.

With the tire 20 engaging the inner circumferential surface 22 of the drum 16, lateral loads Fy can be applied by movement of the drum 16 substantially parallel to the axis of rotation 26. A slide assembly 30 is provided for movement of the drum 16. An actuator system 36 displaces the drum 16 on the slide assembly 30 to apply lateral loads Fy.

Generally, the support structure 12 includes a driving motor torque assembly 40 that is supported over a base 42 with a plurality of struts 44. The driving motor torque assembly 40, discussed below in detail, includes a motor that drives a spindle 48 which, in turn, drives the tire and wheel rim assembly 14. Typically, the tire and wheel rim assembly 14 is supported on the spindle 48 with production components 50 (FIG. 2) of the vehicle suspension (i.e. those components which are generally provided on the motor vehicle). Production brake components 51, such as a brake caliper or brake drum, may also be provided and used conventionally to selectively inhibit rotation of the tire and wheel rim assembly 14. A suitable fixture supports the suspension and brake components on the spindle 48 in proper relation to each other. It should be noted that the tire and wheel rim assembly 14, spindle and/or braking components may be those suitable for application in a motor vehicle as well as those specially designed for the testing apparatus 10.

Figure 2:
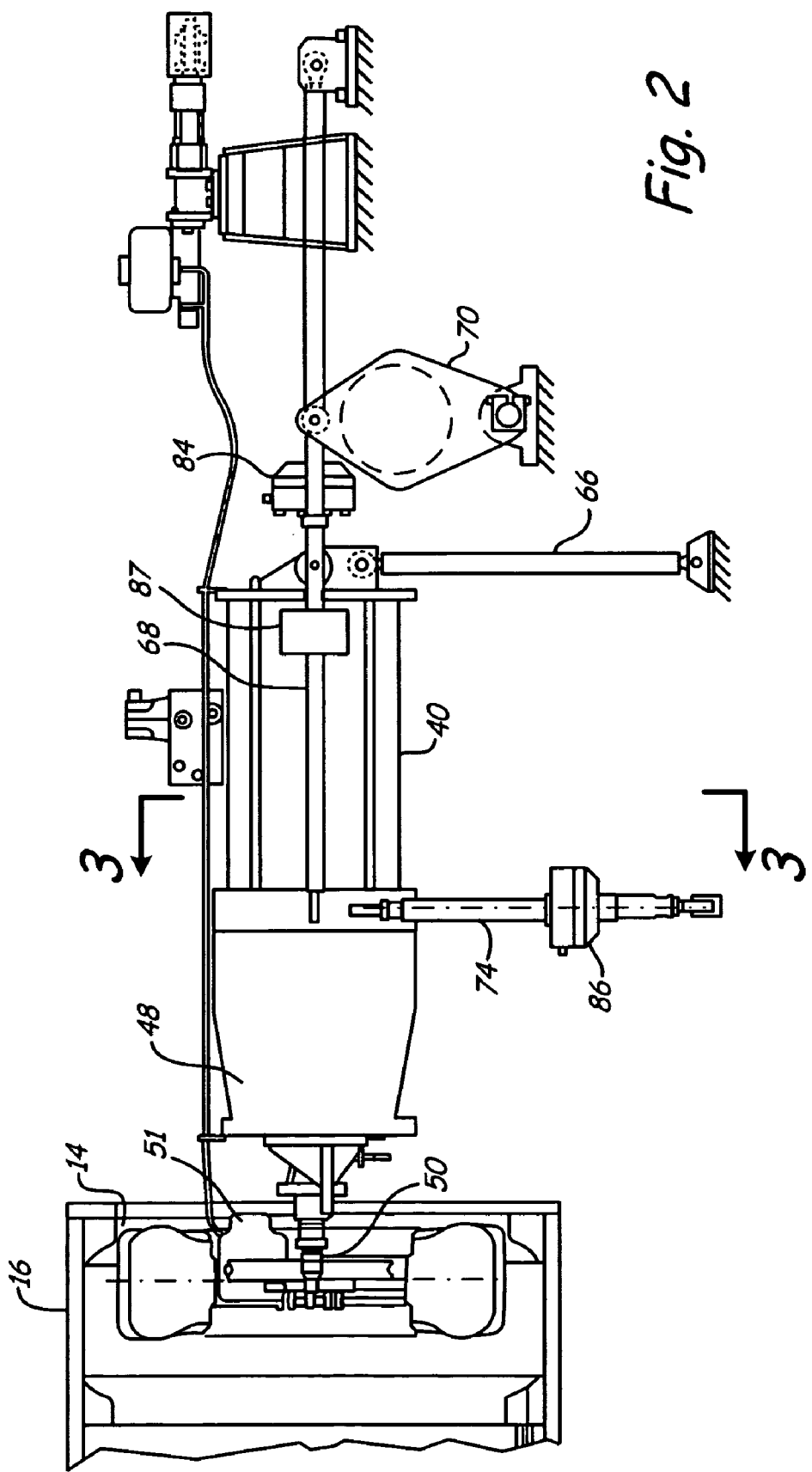
FIG. 2 is an elevational view of the testing apparatus with portions removed.
Figure 3:
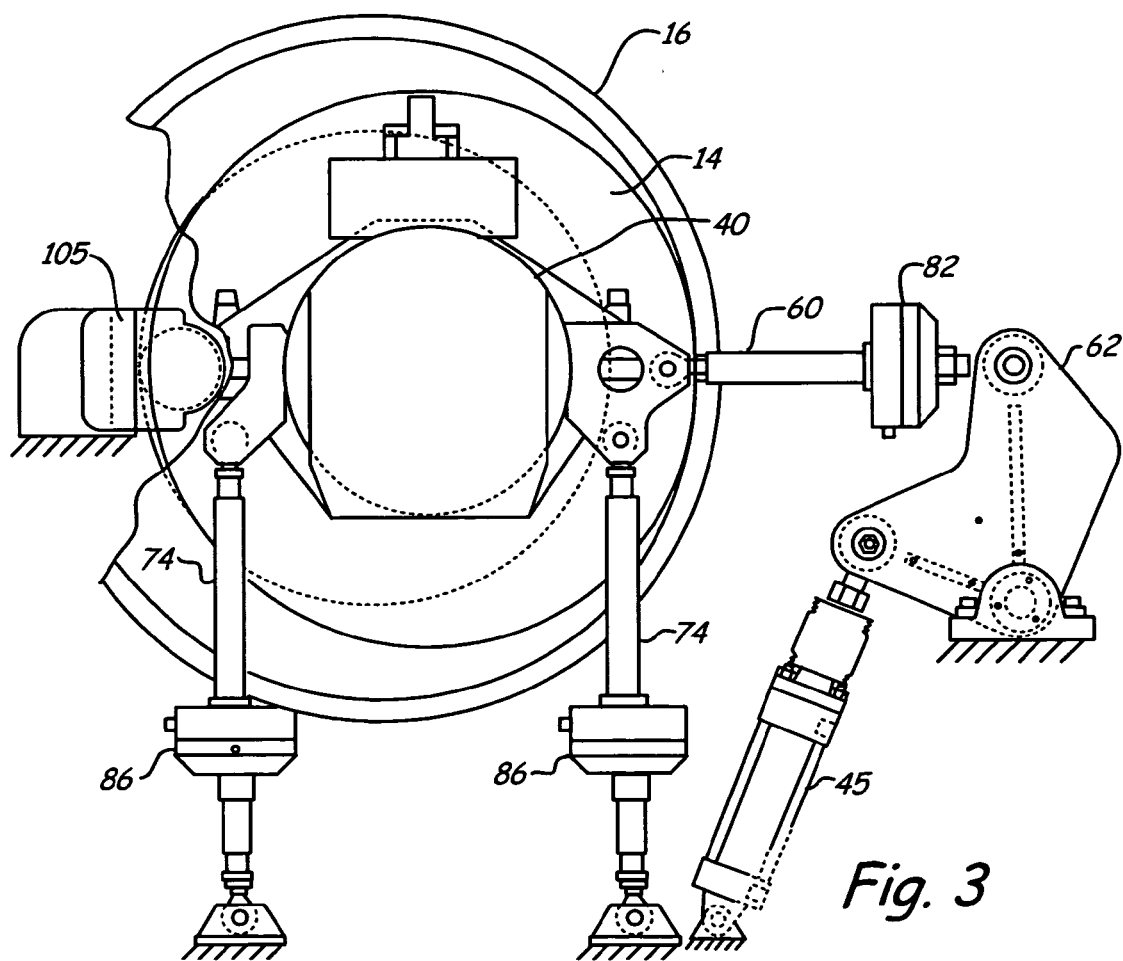
FIG. 3 is a schematic sectional view taken along lines 3-3 in FIG. 2 with portions removed.

The plurality of struts 44 movably support the drive motor assembly 40 and tire and wheel rim assembly 14 attached thereto. Referring to FIGS. 1 and 2, the plurality of struts 44 include a strut 60 that is operably connected to an actuator 45. The actuator 45 applies a radial load through the strut 60 so as to simulate substantially vertical loads Fz on a motor vehicle such as the vehicle weight and dynamic loading. In the embodiment illustrated, a bell crank 62 is provided as a lever arm and to maintain a. compact assembly. Direct connection of the actuator 45 to the strut 60 can also be provided.

Lateral loads are reacted through a strut 64 that is connected between the driving motor torque assembly 40 and the support base 42. A pair of vertical struts 74 support the drive motor assembly 40 above the base support 42. In the embodiment illustrated, stabilizing struts 66 and 68 are also provided, the struts 66 being connected to a common pivoting member 70.

The driving motor torque assembly 40 rotates the tire and wheel rim assembly 14 and applies drive torque through the spindle 48. A braking torque is generated when the braking components (e.g. brake caliper) is operated to inhibit rotation of the tire and wheel rim assembly 14.

A controller 80 receives measurement signals indicative of loads applied to rim of the wheel assembly 14. In the embodiment illustrated, a load cell 82 on strut 60 is used to measure radial or vertical loads Fz, while a load cell 84 on strut 66 measures lateral loads Fy. The struts 66 and pivoting member 70 isolate moments from the load cell 84. Drive torque and braking torque are measured through load cells 86 provided on the vertical struts 74. Based on desired and measured loads, the controller 80 provides command signals to the motor 24, drive motor assembly 40 and the actuators 36, 45. It should also be noted the camber angle of the rim of the wheel assembly 14 upon the drum 16 can be adjusted by rotating or moving base 42 as indicated by double arrow 49, herein via actuator 47 (rotary or linear), which is schematically illustrated. The overturning moment Mx upon the rim of the wheel assembly is changed by changing the camber angle. As appreciated by those skilled in the art, the controller 80 can be an analog controller, a digital controller, or a combination thereof.

Figure 7:
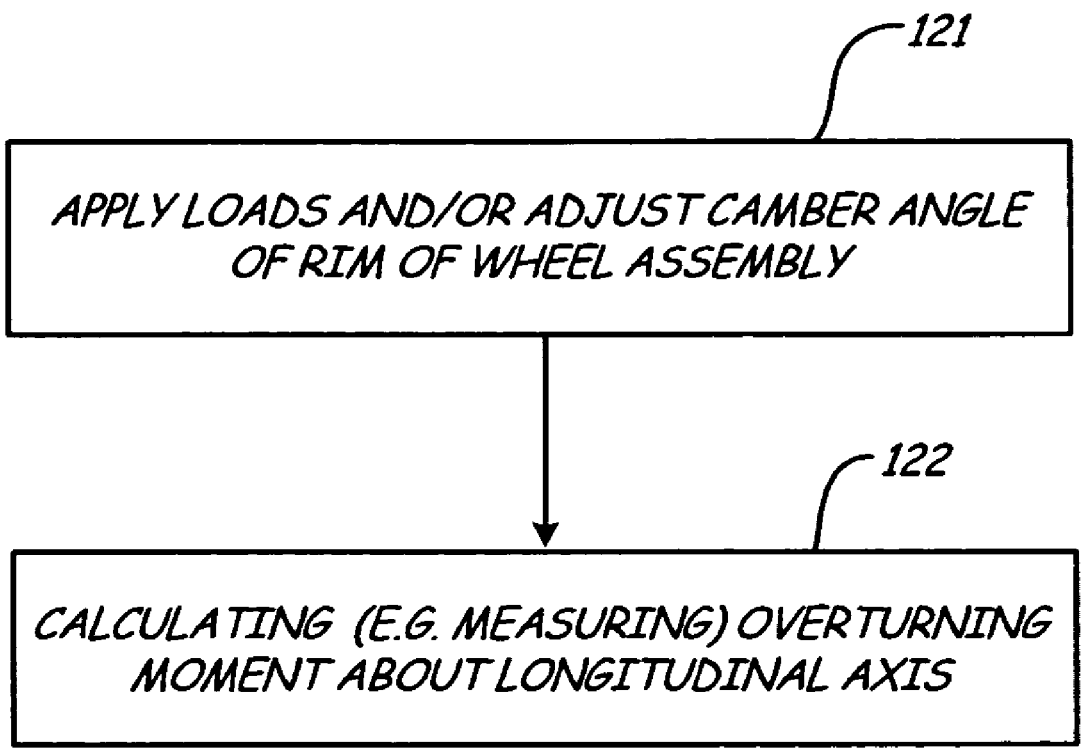
FIG. 7 is a flowchart illustrating a method of obtaining drive files for a testing machine for wheel rim testing.

The new control methodology provided herein enhances a testing apparatus, such as apparatus 10 described above, that applies road forces to a tire mounted on a wheel. In general, the new methodology can eliminate the need for strain gauged wheel rims because this methodology measures the forces at the tire patch and calculates the camber angle using the derived overturning moment Mx. In general, the test process includes having a predetermined Fy, Fz, as well as Mx. The overturning moment Mx provides feedback that is used to establish the machine settings (i.e. camber angle). In particular, Wy and Fz are applied and the camber angle or position is controlled at step 121 (FIG. 7), while calculating (e.g. measuring) overturning moment Mx at step 122. These machine settings are combined with the load pairs, Fy and Fz, to create test data points that can be reproduced for long term fatigue testing of the wheel rim. In this manner, drive files for wheel fatigue testing can be obtained from apparatus 10, where the drive files and apparatus 10 can be then used for testing other or similar wheel assemblies.

In one embodiment, calculation of Mx can be done in a closed loop control methodology. In other words, the system would control Fy, Fz and Mx, while monitoring the camber angle. However, in practice, the signals used to calculate Mx can be noisy, thus making the control of Mx difficult. Therefore, in another embodiment, calculation of Mx includes measuring a parameter indicative of Mx, wherein Mx is more predictable and/or repeatable with the wheel assembly not rotating, although rotation can be provided if desired.

In one embodiment, the camber angle is swept until the desired Mx is obtained. This angle is recorded. The camber angle is changed in the same direction a few degrees and then returned until the desired Mx is again obtained and the camber angle is again recorded. The final camber angle is an average the two recorded values in order to account for hysteresis. An aspect of the invention thus improves the mapping process.

Typically, as is known in the art, drum 16 includes an inner curb to provide ability to generate a lateral load, for example, as provided in U.S. Pat. No. 6,116,084, the content of which is hereby incorporated by reference in its entirety. In some embodiments, in order to generate desired lateral loads, an inner surface of the drum 16 can be modified to increase friction, for example, by providing a rough surface, specifically so that the tire does not excessively climb the curb during testing.

In yet a further embodiment, the mapping process can be improved by finding a relationship between Fy, Fz and camber angle to shorten the mapping process. In particular, different load pair combinations of Fy, Fz, and camber angle can be obtained to determine the relationship (e.g. mathematical, graphical, tabular, numerical) of Fy, Fz, and camber angle for a target Mx. In this manner, it is possible to experimentally map the camber angle for a subset of the load pairs, which would then allow one to determine the camber angle for the rest of the desired load pairs, thereby reducing the amount of time needed for the mapping process.

As described above, test apparatus 10 can measure My at the wheel rotation axis, and vertical and lateral forces (Fy, Fz) at the tire patch through load cells 82 and 86. The longitudinal force Fx is typically derived from the moment My at the center of the rotating drum, where, $$Fx = My/\text{Radius of drum 16}.$$

Figure 4:
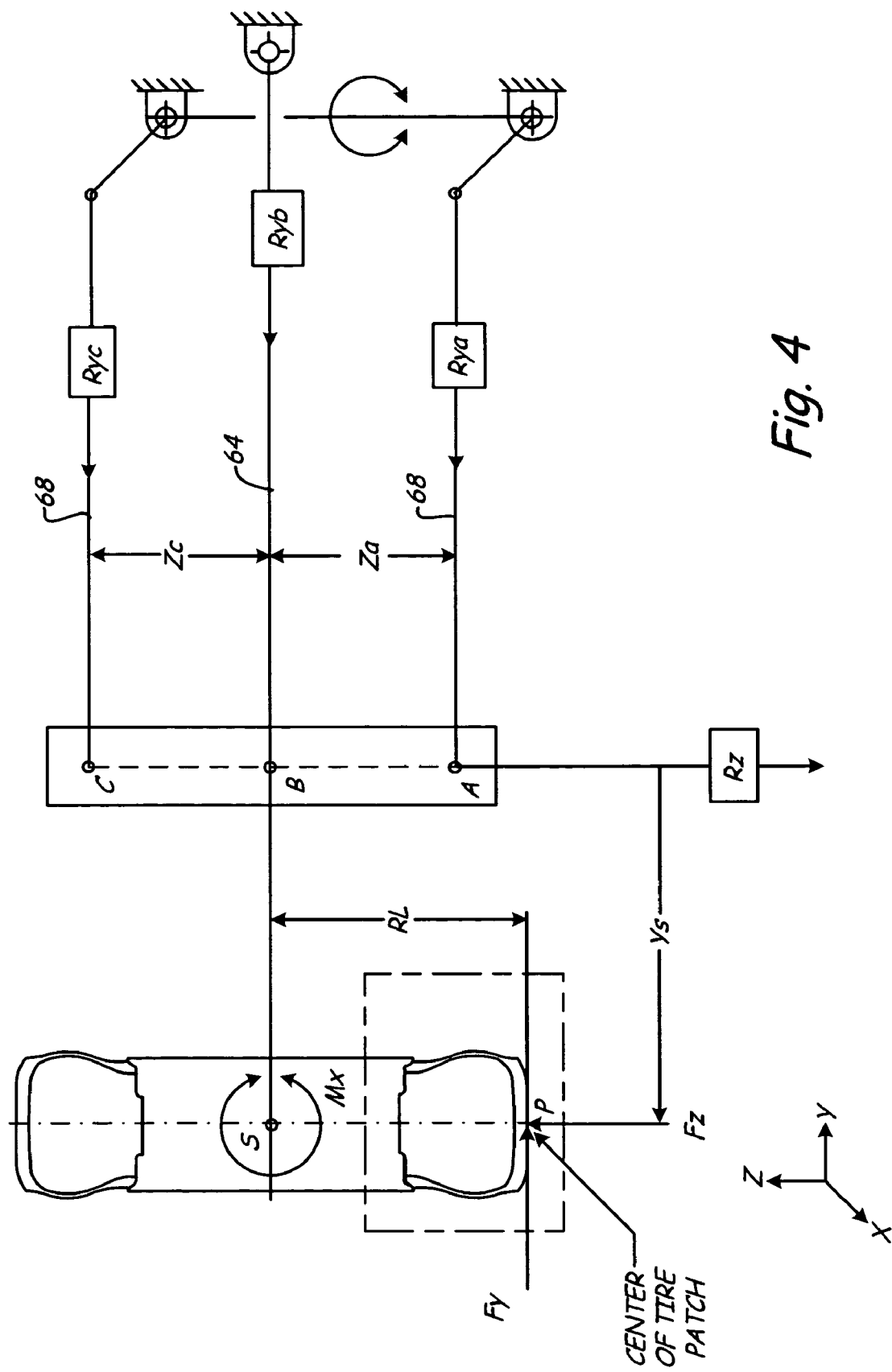
FIG. 4 is a schematic representation of the testing apparatus of FIG. 1.

The description provided below provides a means to measure the overturning moment, Mx. With respect to testing apparatus 10 and FIG. 4, a overturning moment Mx can be calculated as (with or without rotating the drum and wheel/tire assembly):

$$Mx = Rya*Za - Ryc*Zc + Rz*Ys$$

where, the moment Mx is calculated at the center of the tire spindle, as indicated in FIG. 4, located at the axial position of the machine's hub mounting face, denoted by the letter (S). In testing apparatus 10, load cells 87 are provided to measure the forces Rya and Ryb, while the kinematics of testing apparatus 10 provide for the substitution of Fy=Ryb and Rz=Fz, where the forces Ryb and Rz are provided by load cells 84 and 82. (Other known relationships for one or more load cells about the longitudinal axis can be used.)

With reference to FIG. 4, the strut loads are:

$$Rya = (Mx - FzYs)/Za + Zc$$

$$Ryb = Fy$$

$$Ryc = -Rya$$

(Note Rya and Ryc are presumed equal and opposite, thus only one load cell 87 need be used, although two are generally preferred.)

$$Rz = Fz$$

$$Mx = FyRL$$

while, the wheel loads are:

$$Fy = Ryb$$

$$Fz = Rz$$

$$Mx = Rya(Za + Zc) + RzYs$$

It should be noted the kinematic independence of the testing apparatus 10 reduces the complexity of the equations required to calculate the overturning moment, Mx. However, individuals skilled in the art of kinematics can readily develop the equations for other types of well-known testing machines such as or similar to those described in SAE J2562 Surface Vehicle Recommended Practice "Biaxial Wheel Fatigue Test" issued August 2003 (e.g. "Type A" illustrated in FIG. 5 and described at 5.1.1.6 and "Type B" illustrated in FIG. 6 and described at 5.1.1.7. "Type C" illustrated in FIG. 7 and described at 5.1.1.8 corresponds to a Biaxial version of apparatus 10).

Figure 5:
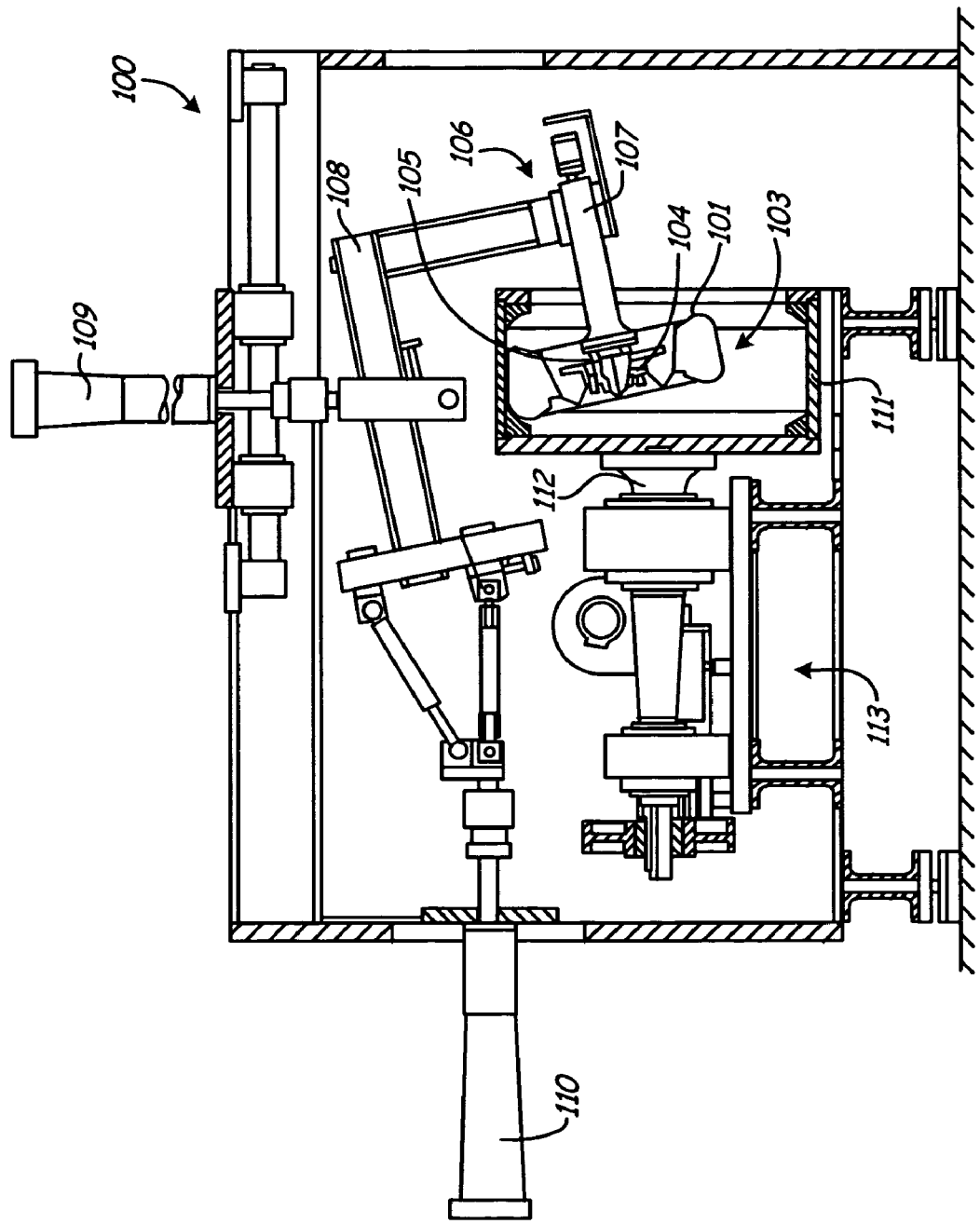
FIG. 5 is a schematic view of a second embodiment of a rolling wheel testing apparatus for practicing aspects of the present invention.

A short description of the "Type A" and "Type B" apparatuses are herein provided. Referring to FIG. 5, apparatus 100 (Type A) includes a loading bow. 108 which, together with an axle pin 107, forms a mounting device 106 for fastening a vehicle wheel 103 in a rotatable manner. Via said loading bow 108, the axle pin 107, wheel bearings 105, a wheel hub 104 and the wheel bolts, a vertical or radial force and a lateral or axial force are introduced into the wheel dish, namely in such a way that the reaction forces arising at a tire 101 are removed at a defined wheel contact point. For applying a constant or variably high vertical or radial force acting in the radial direction of the vehicle wheel 103, a vertical or radial loading device 109 is provided. For applying a constant or variably high lateral or axial force acting in the axial direction of the vehicle wheel 103, a lateral or axial loading device 110 is provided.

A drum 111 is provided, which is disposed in such a manner around the vehicle wheel 103 that the vehicle wheel 103 may, via the tire 101 situated thereon, be brought into rolling contact with the inner peripheral surface of the drum. A drive shaft 112 fastened to the drum 111 is coupled to a drive motor 113 to drive the drum 111. A detailed discussion of this type of apparatus is further provided in U.S. Pat. No. 6,116,084, the content of which is hereby incorporated by reference in its entirety. In apparatus 100, the camber angle can be changed through operation of actuators supporting bow 108 by moving the wheel assembly relative to the drum, while the overturning moment can be calculated from signals from load cells, pressure sensors in the actuators, or the like.

Figure 6:
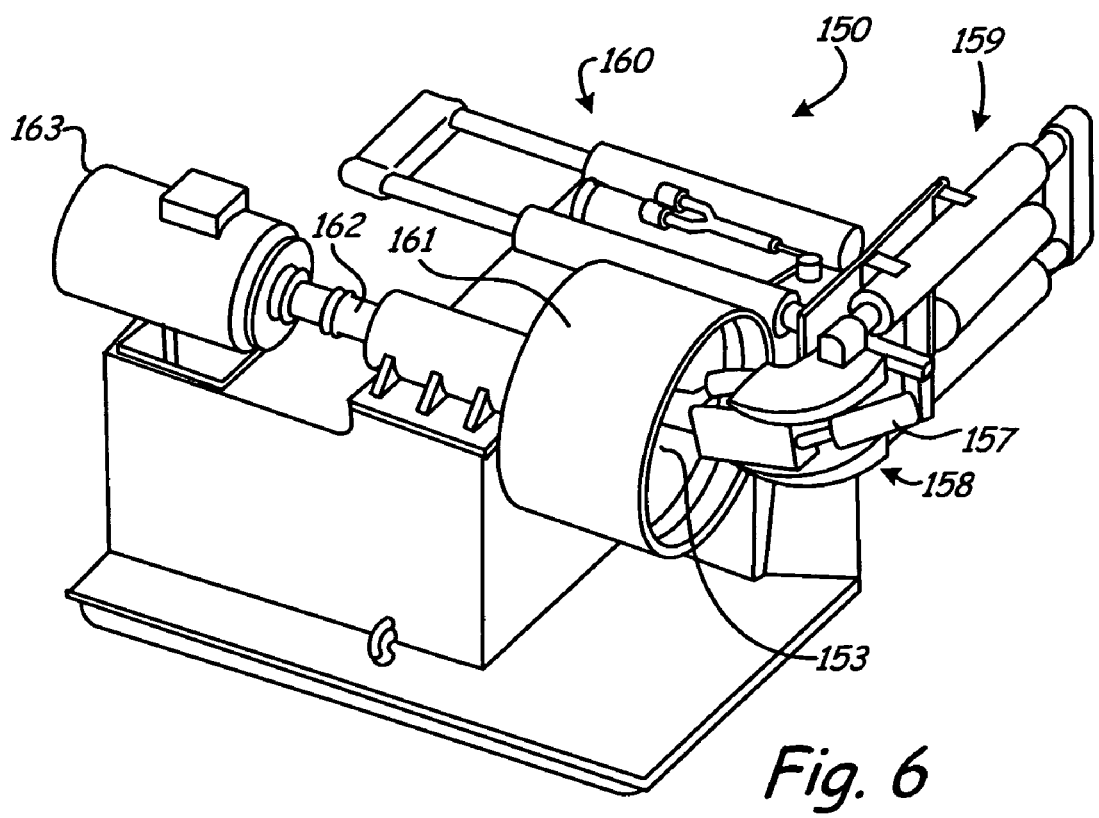
FIG. 6 is a perspective view of a third embodiment of a rolling wheel testing apparatus for practicing aspects of the present invention.

Referring to FIG. 6, apparatus 150 (Type B) includes a swivel head 158 that forms a mounting device 106 for fastening a vehicle wheel 153 in a rotatable manner. Via said swivel head 158, lateral and radial forces, and a camber angle are generated. For applying a constant or variably high vertical or radial force acting in the radial direction of the vehicle wheel 153, a vertical or radial loading device 159 is provided. For applying a constant or variably high lateral or axial force acting in the axial direction of the vehicle wheel 153, a lateral or axial loading device 160 is provided. An actuator 157 provides camber adjustment by moving the wheel assembly relative to the drum.

A drum 161 is provided, which is disposed in such a manner around the vehicle wheel 153 that the vehicle wheel 153 may, via the tire situated thereon, be brought into rolling contact with the inner peripheral surface of the drum 161. A drive shaft 162 fastened to the drum 161 is coupled to a drive motor 163 to drive the drum 161. Apparatus 150 is sold by Instron Structural Testing Corporation of Novi, Michigan. In apparatus 100, the camber angle can be changed through operation of the actuator 157, while the overturning moment can be calculated from signals from load cells, pressure sensors in the actuator 157, or the like.

Although the present invention has been described with reference to preferred embodiments, workers skilled in the art will recognize that changes may be made in form and detail without departing from the spirit and scope of the invention.

What is claimed is:

1. A method for obtaining desired loading on a wheel rim, the method comprising:
    providing a wheel assembly in contact with a drum surface, the wheel assembly being rotatable about an axis defining a lateral axis, and wherein a vertical axis extends through a drum surface in contact with a tire of the wheel assembly and is orthogonal to the lateral axis, and a longitudinal axis is defined orthogonal to both the lateral and vertical axes;
    calculating an overturning moment applied to the wheel rim about the longitudinal axis;
    adjusting at least one of force loads applied to the wheel rim and a camber angle of the wheel rim relative to the drum surface to obtain desired loading on the wheel rim based on the calculated overturning moment;
    recording the force loads applied to the wheel rim and the camber angle of the wheel rim relative to the drum surface at the desired loading on the wheel rim; and
    using the recorded force loads applied to the wheel rim and the camber angle of the wheel rim relative to the drum surface in a wheel testing machine to obtain the desired loading on another wheel rim.

2. The method of claim 1 wherein the steps of calculating and adjusting are automated.

3. The method of claim 1 wherein adjusting the camber angle comprises moving the drum relative to the wheel assembly.

4. The method of claim 1 wherein adjusting the camber angle comprises moving the wheel assembly relative to the drum assembly.

5. The method of claim 1 wherein the drum is not rotated during the steps of calculating and adjusting.

6. The method of claim 1 wherein the drum is rotated during the steps of calculating and adjusting.

7. The method of claim 1 and further comprising:
determining a relationship of force loads and camber angle for a target overturning moment about the longitudinal axis.

8. The method of claim 1 wherein adjusting comprises adjusting a vertical force applied to the wheel rim substantially parallel to the vertical axis to a first selected level, adjusting a lateral force applied to the wheel rim substantially parallel to the lateral axis to a second selected level, adjusting the camber angle of the wheel rim relative to the drum surface to obtain desired loading on the wheel rim based on the calculated overturning moment.

9. The method of claim 8 and further comprising recording the vertical force applied to the wheel rim, the lateral force applied to the wheel rim and the camber angle of the wheel rim relative to the drum surface at the desired loading on the wheel rim.

10. The method of claim 9 and further comprising using the recorded the vertical force applied to the wheel rim, the lateral force applied to the wheel rim and the camber angle of the wheel rim relative to the drum surface in a wheel testing machine to obtain the desired loading on another wheel rim.

11. The method of claim 8 wherein calculating the overturning moment applied to the wheel rim about the longitudinal axis comprises measuring a force indicative of the overturning moment.

12. The method of claim 11 wherein measuring the force comprises measuring two forces, wherein the forces are disposed in a known relationship about the longitudinal axis.

13. The method of claim 11 wherein measuring comprises using a load cell.

14. A method for obtaining desired loading on a wheel rim, the method comprising:
providing a wheel assembly in contact with a drum surface, the wheel assembly being rotatable about an axis defining a lateral axis, and wherein a vertical axis extends through a drum surface in contact with a tire of the wheel assembly and is orthogonal to the lateral axis, and a longitudinal axis is defined orthogonal to both the lateral and vertical axes;
measuring a parameter indicative of an overturning moment applied to the wheel rim about the longitudinal axis;
adjusting a camber angle of the wheel rim relative to the drum surface to obtain a desired overturning moment on the wheel rim about the longitudinal axis.

15. The method of claim 14 wherein adjusting the camber angle comprises moving the drum relative to the wheel assembly.

16. The method of claim 14 wherein adjusting the camber angle comprises moving the wheel assembly relative to the drum assembly.

17. The method of claim 14 and further comprising:
determining a relationship of force loads and camber angle for a target overturning moment about the longitudinal axis.

18. The method of claim 14 and further comprising calculating an overturning moment applied to the wheel rim about the longitudinal axis using the measured parameter.

19. The method of claim 18 wherein adjusting comprises adjusting the camber angle of the wheel rim relative to the drum surface to obtain desired loading on the wheel rim based on the calculated overturning moment.

20. The method of claim 18 wherein the parameter comprises a force, and wherein calculating the overturning moment applied to the wheel rim about the longitudinal axis comprises using the force indicative of the overturning moment.

21. The method of claim 20 wherein the parameter comprises two forces, wherein the forces are disposed in a known relationship about the longitudinal axis.

22. A testing machine for wheel rim testing, the testing machine comprising:
a rotatable drum;
a wheel assembly in contact with a surface of the drum, the wheel assembly being rotatable about an axis defining a lateral axis, and wherein a vertical axis extends through a drum surface in contact with a tire of the wheel assembly and is orthogonal to the lateral axis, and a longitudinal axis is defined orthogonal to both the lateral and vertical axes;
a device adapted to measure a parameter indicative of an overturning moment applied to the wheel rim about the longitudinal axis;
a mechanism adapted to adjust a camber angle of the wheel rim relative to the drum surface;
a controller coupled to the device and the mechanism to control the mechanism in order to obtain a desired overturning moment on the wheel rim about the longitudinal axis.

23. The testing machine of claim 22 wherein the mechanism is coupled to the drum to selectively move the drum while the wheel assembly remains stationary.

24. The testing machine of claim 22 wherein the mechanism is coupled to the wheel assembly to selectively move the wheel assembly while the drum remains stationary, but rotatable.

25. The testing machine of claim 22 wherein the first-mentioned device is a load cell and the second device is a load cell.

26. The testing machine of claim 22 wherein the controller is adapted to control the mechanism in order to obtain the desired overturning moment on the wheel rim about the longitudinal axis while the drum is rotated.

27. The testing machine of claim 22 wherein the device is adapted to measure a force.

28. The testing machine of claim 22 and further comprising a second device coupled to the controller and adapted to measure a second force, wherein the first-mentioned device and the second device are arranged relative to the longitudinal axis to measure forces disposed in a known relationship about the longitudinal axis.

* * * * *